United States Patent [19]

Mannhart et al.

[11] 4,397,214
[45] Aug. 9, 1983

[54] APPARATUS FOR LUBRICATING THE LOCKING BOLTS OF A BREECHBLOCK OF AN AUTOMATIC FIRING WEAPON

[75] Inventors: Peter Mannhart, Hochdorf; Bruno Ruppen, Zürich, both of Switzerland

[73] Assignee: Werkzeugmaschinenfabrik Oerlikon-Bührle AG, Zürich, Switzerland

[21] Appl. No.: 293,271

[22] Filed: Aug. 17, 1981

[30] Foreign Application Priority Data

Sep. 2, 1980 [CH] Switzerland .................. 6587/80

[51] Int. Cl.³ .................. F41D 3/00; F41D 11/00
[52] U.S. Cl. .................. 89/1 E; 89/190; 184/29
[58] Field of Search .............. 89/1 E, 190, 191, 43 R; 184/29, 6, 14

[56] References Cited

U.S. PATENT DOCUMENTS

| 1,073,298 | 9/1913 | Smith | 89/1 E |
| 1,848,302 | 3/1932 | Barnes | 89/43 R |
| 1,936,104 | 11/1933 | Bizzarri | 222/254 |
| 2,164,273 | 6/1939 | Hodson | 184/29 |
| 3,383,984 | 5/1968 | D'Andrea | 89/1 E |
| 3,391,602 | 7/1968 | Brooks et al. | 89/1 E |

FOREIGN PATENT DOCUMENTS

| 585020 | 9/1933 | Fed. Rep. of Germany. |  |
| 971387 | 7/1950 | France | 89/1 E |
| 471362 | 4/1969 | Switzerland. |  |
| 509563 | 6/1971 | Switzerland. |  |

OTHER PUBLICATIONS

Publication "Antriebstechnik", vol. 15, (1976), No. 10, Oct. 1976, article of Ortmann, et al., entitled Sprühschmieranlagen für Fett.

Primary Examiner—David H. Brown
Attorney, Agent, or Firm—Werner W. Kleeman

[57] ABSTRACT

An apparatus for the lubrication of the locking bolts of a breechblock of an automatic firing weapon enables, with very little maintenance, reliable lubrication of the locking bolts. The lubrication apparatus contains a hydraulically loaded supply container, a hydraulically actuatable dosing device, and a hydraulically releaseable or unlockable check or non-return valve, in order to spray or otherwise apply a lubricant by means of spray or injection nozzles upon the locking bolts within a breechblock housing.

2 Claims, 3 Drawing Figures

APPARATUS FOR LUBRICATING THE LOCKING BOLTS OF A BREECHBLOCK OF AN AUTOMATIC FIRING WEAPON

BACKGROUND OF THE INVENTION

The present invention relates to a new and improved construction of apparatus for the lubrication of the locking bolts of a breechblock of an automatic firing weapon during each firing of a round or during each firing of a surge or series of rounds, as the case may be.

There are already known in this technology lubrication apparatuses by means of which, due to spring force, there can be generated the requisite pressure at the lubricant. These known lubrication apparatuses require a relatively great amount of maintenance and do not afford any adequately reliable lubrication.

SUMMARY OF THE INVENTION

Therefore, with the foregoing in mind it is a primary object of the present invention to provide a new and improved construction of lubrication apparatus for the effective lubrication of the locking bolts of a breechblock of an automatic firing weapon, which is not associated with the aforementioned drawbacks and limitations of the prior art proposals.

Another and more specific object of the present invention aims at providing an apparatus for the lubrication of the locking bolts of an automatic firing weapon which enables reliable and effective lubrication of the locking bolts and works with very little maintenance.

Still a further significant object of the present invention aims at the provision of a new and improved lubrication apparatus for a firing weapon, which apparatus is relativey simple in construction and design, extremely reliable in operation, not readily subject to breakdown or malfunction and requires a minimum of maintenance and servicing.

Now in order to implement these and still further objects of the invention, which will become more readily apparent as the description proceeds, the lubrication apparatus of the present development is manifested by the features that there is provided a supply container for the lubricant or lubricating grease which is subjected to a substantially constant hydraulic pressure. A dosing device is connected to the lubricant supply container. Arranged within the dosing device is a hydraulically actuatable piston for dosing the lubricant. A hydraulically unlockable or releasable check or non-return valve is provided which is connected with the dosing device and which, when released, permits passage of the dosed quantity of lubricant. A respective injection or spray nozzle is arranged to both sides of the breechblock housing of the firing weapon and these nozzles are connected with the related releasable non-return or check valve, in order to inject or spray lubricant through openings in the breechblock housing onto the locking bolts of the breechblock.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
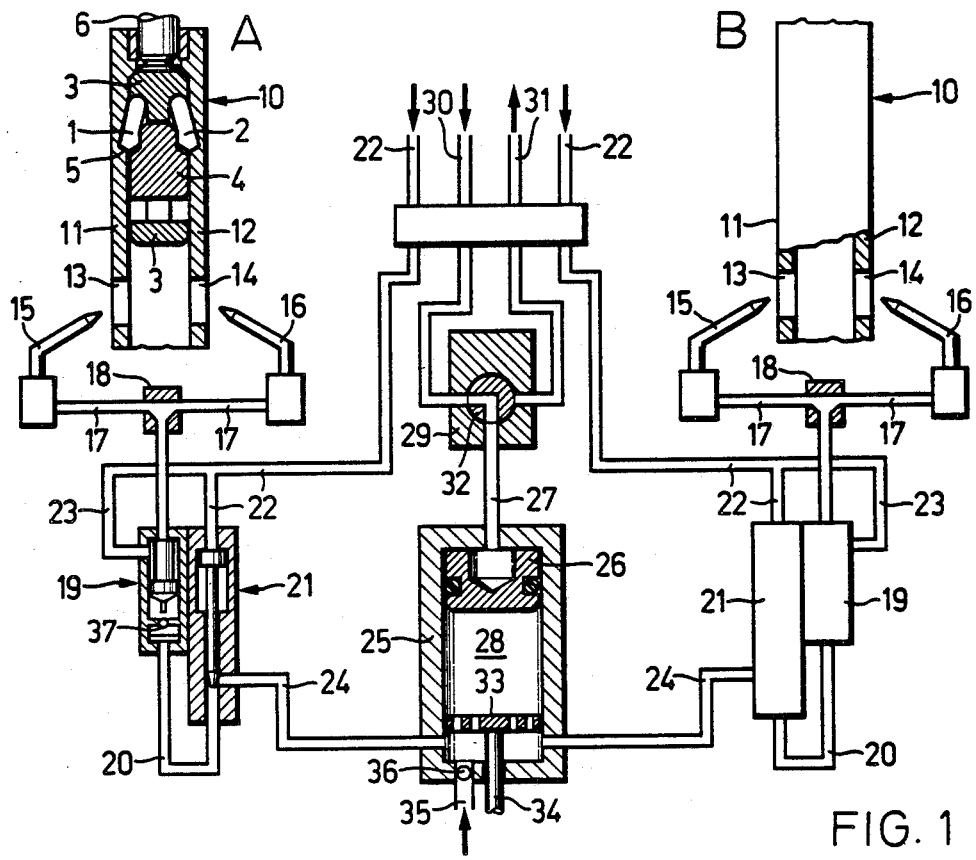
FIG. 1 is a schematic illustration of an exemplary embodiment of lubrication apparatus according to the invention.

Turning attention now to the drawings, it will be understood that there has been illustrated therein lubrication apparatus for lubricating the locking bolts of a breechblock of an automatic firing weapon. In FIG. 1 the lubrication apparatus of the invention is used, as stated, for lubricating the locking bolts 1 and 2 of two firing weapons A and B. These locking bolts 1 and 2 are pivotably mounted in a breechblock head 3 and are retained in recesses 5 by a control element 4. These recesses 5 are located in side walls 11 and 12 of a breechblock housing 10. Arranged forwardly of the breechblock head 3 is a cartridge 6. Upon firing of the cartridge 6 initially there is displaced the control element 4 and there are then released the locking bolts 1 and 2. These locking bolts 1 and 2 are pivoted-in, so that the breechblock head 3 along with the locking bolts 1 and 2 and the control element 4 can shift towards the rear until the locking bolts 1 and 2 arrive at the region of two windows 13 and 14. These locking bolts 1 and 2 are subjected to a large amount of wear and therefore must be frequently lubricated at prescribed intervals. For this purpose there can be sprayed or otherwise introduced a lubricant through both the windows 13 and 14 into the interior of the breechblock housing 10 onto both of the locking bolts 1 and 2. In order to inject the lubricant there is arranged forwardly of each window 13 and 14 a respective injection or spray nozzle 15 and 16. Both of the spray nozzles 15 and 16 are connected by means of a pipe line or conduit 17 and a branch portion 18 with a releasable or unlockable check or non-return valve 19 or equivalent structure.

Figure 3:
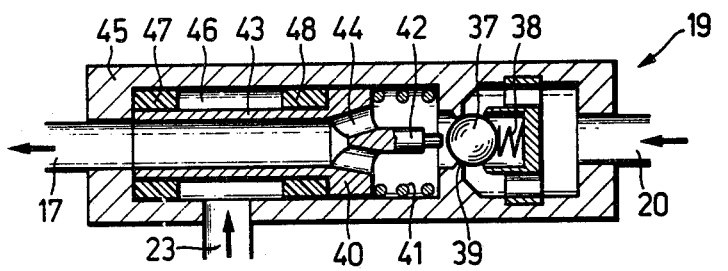
FIG. 3 is a longitudinal sectional view through an unlockable or releasable check or non-return valve which may be used in the invention.

This non-return valve 19, as will be seen by referring to FIGS. 1 and 3, possesses a blocking body 37, for instance here shown in the form of a ball or spherical member, capable of being pressed by means of a spring 38 or the like against a seat 39, so that no lubricant can move from a line 20 through the check or non-return valve 19 into the aforementioned pipe line or conduit 17. In order to release the check valve 19 there is provided a piston or piston member 40 which is shifted into its rearmost position by the action of a spring 41 or equivalent force-applying means. The piston 40 possesses an actuation bolt 42, by means of which the ball 37 can be raised from its seat 39 against the force of the spring 38. At the piston 40 there is affixed a sleeve member 43. This piston 40 possesses bores 44 which enable passage of the lubricant or lubricating grease through the piston 40 into the interior of the sleeve member or sleeve 43.

Between the sleeve 43 of the piston 40 and a housing 45 of the non-return or check valve 19 there is provided an annular or ring-shaped chamber or space 46 into which opens a hydraulic line or conduit 23. The annular or ring-shaped chamber or space 46 is closed by two sealing rings or seals 47 and 48, which prevent hydraulic liquid from moving out of the annular space or chamber 46 and coming into contact with the lubricant or grease.

The mode of operation of the releasable check or non-return valve 19 is as follows: in order to release the check valve 19 there is generated within the ring-shaped chamber or space 46 a pressure by means of the line 23, so that the piston 40 along with the sleeve 43 is shifted towards the right of FIG. 3 against the force of the spring 41. As a result, the actuation bolt 42 or the like impacts against the ball 47 and raises such from its ball seat 39. Hence, lubricant can move out of the line 20 past the spring 38 and about the ball or spherical member 37 through the bores 44 of the piston 40 and through the sleeve 43 of the piston 40 into the line or conduit 17 and then arrives at the injection or spray nozzles 15 and 16. As soon as the hydraulic pressure in the line 23 disappears, then the spring 41 displaces the piston 40 towards the left of FIG. 3 and the actuation piston 42 likewise is shifted toward the left and the ball 37 is pressed by the spring 38 against the seat 39, so that the throughflow of lubricant out of the line 20 into the line or conduit 17 is interrupted.

Figure 2:
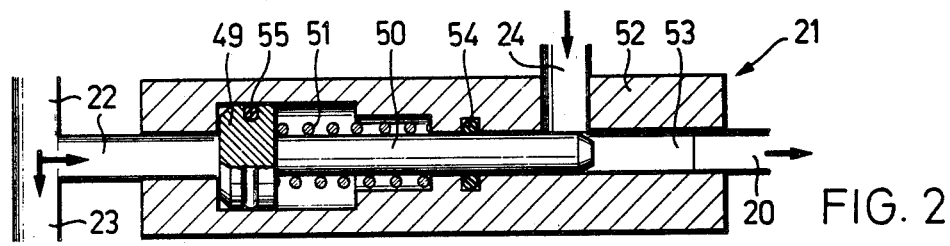
FIG. 2 is a longitudinal sectional view through a dosing device which can be used in the arrangement of FIG. 1.

Connected with the releasable check or non-return valve 19 is a dosing device 21 by means of a line or conduit 20. The construction of this dosing device or dosing means 21 will be apparent by referring to FIGS. 1 and 2.

The dosing device 21 contains a piston 49 at which there is attached a plunger 50. A spring 51, bearing at one end at the piston 49 and at the other end at the housing 52 of the dosing device 21, strives to shift the piston 49 towards the left of the showing of FIG. 2. Acting opposite to the force of the spring 51 is the hydraulic pressure which is generated by a hydraulic line 22 connected with the housing 52, as best seen by reverting to the illustration of FIG. 1.

The plunger 50 controls the throughflow of lubricant out of a further line or conduit 24 connected with the housing 52 into a chamber 53 within such housing 52. This chamber or compartment 53 is connected with the aforementioned line or conduit 20, which leads to the releasable check or non-return valve 19. Sealing rings 54 and 55 prevent admixing of the hydraulic liquid and the lubricant.

The mode of operation of the dosing device 21 is as follows: as long as the hydraulic line or conduit 22 is without pressure, then the piston 49 along with the plunger 50 is shifted by the action of the spring 51 towards the left of the showing of FIG. 3 and lubricant can arrive from the line 24 in the chamber or compartment 53 and from that location can flow through the line 20 to the non-return or check valve 19.

Since, as stated, the line or conduit 22 is without pressure, the line or conduit 23 (FIG. 1) also is without pressure and the non-return valve 19 is blocked. Therefore, the line 20 and the chamber 53 are filled with lubricant.

As soon as a pressure has built-up in the hydraulic line or conduit 22, then the piston 49 along with the plunger 50 are moved against the force of the spring 51 towards the right of the showing of FIG. 3 and the lubricant is expressed out of the chamber 53 into the line or conduit 20. At the same time there is interrupted the connection between the line 24 and the chamber 53 by the plunger 50. Additionally, there is also simultaneously released the check or non-return valve 19, since a hydraulic pressure also builds-up in the line 23 and opens the check or non-return valve 19. The quantity of lubricant which has been conveyed during actuation of the dosing device 21 is therefore exclusively dependent upon the size of the chamber or compartment 53.

The control line 22 provided for actuating the dosing device 21, and at which control line 22 there is connected the branch line 23 for releasing the non-return valve 19, is connected in any suitable manner with the weapon and upon actuation of the weapon is placed under pressure.

According to the showing of FIG. 1 the lubricant which is to be dosed is infed to the dosing device 21 by means of a line 24 from a lubricant supply container 25 or equivalent supply or reservoir means. The lubricant arrives from the dosing device 21 by means of line 20, the check or non-return valve 19, the branch portion 18 and the lines 17 at both of the injection or spray nozzles 15 and 16. The lubricant container 25 contains a piston 26 which is impinged with a hydraulic liquid or fluid medium by means of a line or conduit 27, and which expresses the lubricant contained in the chamber 28 by means of the line 24 into the dosing device 21. The line 27 is connected to a vent valve 29.

Continuing, this vent valve 29 possesses a rotary slide 32 or equivalent structure which can be manually actuated. The rotary slide 32 can be shifted selectively into two different positions. In the illustrated position pressurized oil delivered from a supply or feed line 30 is fed by means of the valve 29 and by the line 27 to the piston 26 of the lubricant container 25 and pressurizes the lubricant contained in the chamber or compartment 28. In the other position of the rotary slide 32 the line 27 is connected with a vent line 31 and the lubricant in the chamber or compartment 28 is no longer under pressure. In order to mix the lubricant in the chamber or compartment 28 there is attached a perforated disk 33 to a rod 34 which can be manually actuated. Lubricant can be filled through a line or conduit 35 into the chamber or compartment 28. A check or non-return valve 36 prevents lubricant from flowing back out of the chamber or compartment 28 through the line 35.

The mode of operation of the described apparatus is as follows:

Prior to firing ammunition with both of the automatic firing weapons A and B the not particularly illustrated pressurized medium source is turned-on and the rotary slide 32 is rotated into the position shown in FIG. 1. Consequently, the hydraulic pressurized medium flows through the line 30, the vent valve 29 and the line or conduit 27 behind the piston 26 of the lubricant container or reservoir 25, so that the lubricant contained in the chamber or compartment 28 is placed under pressure. Upon firing ammunition with both of the firing weapons A and B, during each firing of a round or at the start of a series firing, a hydraulic pressure is generated in both lines 22. In the event only one of the two firing weapons A and B is fired, then hydraulic pressure is only generated in the corresponding one line 22.

By virtue of the hydraulic pressure in the line or conduit 22 the dosing device 21 is actuated and by means of the line or conduit 23 there is also actuated the releasable check or non-return valve 19 in the described manner, so that a dosed quantity of lubricant is injected through the injection or spray nozzles 15 and 16 through the windows 13 and 14 onto the locking bolts 1 and 2, respectively.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for lubricating the locking bolts of a breechblock of an automatic firing weapon during each firing of a round or a series of rounds, comprising:
    a supply container for a lubricant within which said lubricant is maintained at a substantially constant hydraulic pressure;
    a dosing device operatively connected with said lubricant supply container;
    said dosing device containing a hydraulically actuated piston for dosing the lubricant;
    means for hydraulically actuating said piston;
    a hydraulically releasable valve means operatively connected with said dosing device;
    said releasable valve means, upon release thereof, permitting passage of a dosed quantity of lubricant;
    a respective lubricant injection nozzle arranged to each side of a breechblock housing of the firing weapon; and
    said releasable valve means being operatively connected with said injection nozzles, in order to inject lubricant through openings of the breechblock housing onto the locking bolts of the breechblock.

2. The apparatus as defined in claim 1, wherein:
    said releasable valve means comprises at least one non-return valve.

* * * * *